United States Patent
Bishoff et al.

(10) Patent No.: US 9,195,240 B2
(45) Date of Patent: Nov. 24, 2015

(54) VALVE ASSEMBLY (71) Applicant: Lorax Systems Inc., Halifax (CA)

(72) Inventors: Mark Bishoff, Halifax (CA); Guy Bishoff, Lethbridge (CA)

(73) Assignee: Lorax Systems, Inc., Halifax (CA)

( * ) Notice: Subject to any disclaimer, the term of this patent is extended or adjusted under 35 U.S.C. 154(b) by 0 days.

(21) Appl. No.: 14/371,781

(22) PCT Filed: Sep. 24, 2013

(86) PCT No.: PCT/CA2013/000810
§ 371 (c)(1),
(2) Date: Jul. 11, 2014

(87) PCT Pub. No.: WO2014/056072
PCT Pub. Date: Apr. 17, 2014

(65) Prior Publication Data
US 2015/0114482 A1   Apr. 30, 2015

Related U.S. Application Data (60) Provisional application No. 61/713,286, filed on Oct. 12, 2012.

(51) Int. Cl.
  *G05D 16/06*   (2006.01)
  *F16K 15/18*   (2006.01)
  *F16K 17/38*   (2006.01)
  *F16K 17/40*   (2006.01)
  *F16K 17/04*   (2006.01)

(52) U.S. Cl.
  CPC .......... *G05D 16/0638* (2013.01); *F16K 15/183* (2013.01); *F16K 15/188* (2013.01); *F16K 17/0406* (2013.01); *F16K 17/383* (2013.01); *F16K 17/40* (2013.01); *Y10T 137/1797* (2015.04)

(58) Field of Classification Search
  CPC ............ G05D 16/0638; F16K 17/0406; F16K 15/188; F16K 17/383; F16K 17/40; F16K 15/183
  USPC ......... 137/72, 75, 77, 73, 68.14, 312; 251/73, 251/66; 222/53
  See application file for complete search history.

(56) References Cited

U.S. PATENT DOCUMENTS 2,397,518 A   4/1946 Allison
2,608,205 A   8/1952 Proctor

OTHER PUBLICATIONS

Patent Cooperation Treaty, "International Search Report" Canadian Searching Authority, document of 3 pages, dated Dec. 17, 2013.

*Primary Examiner* — John K Fristoe, Jr.
*Assistant Examiner* — Nicole Wentlandt
(74) *Attorney, Agent, or Firm* — Akerman LLP; Richard P. Gilly (57) ABSTRACT

A valve assembly adapted to be used in an environment having an environment pressure includes a body having an end adapted to connect to a pipe having a first fluid line at a first pressure and a coaxial second fluid line at a second pressure. A primary passageway defined through the body is adapted to be connected to the first fluid line. A secondary passageway defined in the body is adapted to be connected to the second fluid line. A valve is disposed on the primary passageway. The valve is movable between a first position where the passageway is open and a second position where the passageway is closed in response to the second pressure in the secondary passageway. The first pressure in the primary passageway is greater than the second pressure in the secondary passageway, and the environment pressure is greater than the second pressure in the secondary passageway.

15 Claims, 4 Drawing Sheets

VALVE ASSEMBLY

CROSS REFERENCE TO RELATED APPLICATIONS

This application is a §371 National Phase of PCT/CA2013/000810, filed Sep. 24, 2013, which claims priority to U.S. Provisional Patent Application No. 61/713,286, filed Oct. 12, 2012, the entireties of which are incorporated by reference herein.

TECHNICAL FIELD

The present relates to valves and more specifically to valves assemblies having at least one safety mode.

BACKGROUND

Pipes, hoses and other flow lines can be used to connect a source of fluid, for example an oil tank, to a recipient, for example a furnace. The connection generally includes one or more adapter(s) that connect fittings on a flow line to those on the oil tank and the furnace. When the connection is made between the oil tank and the furnace, the fluid, oil in this example, flows freely through the flow line from the oil tank to the furnace. There are circumstances in which the flow of fluid may need to be interrupted. For example, the adapters may be sheared apart if hit, thereby causing a leak. In other examples, the flow line may rupture from the corrosive effect of the oil. The flow may also be interrupted for maintenance reasons in the absence of any failure of the connection.

Shut-off valves for closing a flow path include breakaway safety valves adapted to break when the valve is subjected to a shearing force of predetermined magnitude. Other valves include safety shut off valves which have a circumferential area of weakness therearound so that if the body is severed along the area of weakness, a stop member is removed and a poppet is allowed to close to prevent fluid flow through the body. Other devices may include a valve comprising a piston controlled shut-off valve, where the piston is spring biased to a valve-closed position and is moved against the spring bias to a valve-open position by normal operating pressure. A drop from normal operating pressure causes the piston to close the valve thereby isolating the faulty circuit. Yet other valves assembly include automatic safety valve closure systems which include a delivery pipe surrounded by a second pipe. The volume between the pipes is filled with an inert fluid, for example water. If the delivery pipe is broken or springs a leak, the change in water pressure will cause the valve to close. These and other known valves are configured to close in response to only one mode of failure of the system they occupy, although other modes of failures may be present, and are also not adapted to deliver high pressure gas.

BRIEF SUMMARY

A valve assembly adapted to be used in an environment having an environment pressure is provided. The valve assembly comprises a body having a first end and a second end. The second end is adapted to connect to a pipe. The pipe has a first fluid line at a first pressure and a second fluid line at a second pressure. The first fluid line is disposed coaxially with the second fluid line. A primary passageway is defined through the body. The passageway has a first end coinciding with the first end of the body and a second end coinciding with the second end of the body. The second end of the primary passageway is adapted to be connected to the first fluid line. A secondary passageway is defined in the body. The secondary passageway has a first end and a second end. The secondary passageway is fluidly isolated from the primary passageway. The second end of the secondary passageway is adapted to be connected to the second fluid line. A valve is disposed on the primary passageway between the first end and the second end. The valve is movable between a first position where the primary passageway is open and fluid communicates between the first end and the second end of the primary passageway, and a second position where the primary passageway is closed and fluid is prevented from communicating between the first end and the second end of the primary passageway. The valve is adapted to be movable to the first and second positions in response to the second pressure in the secondary passageway. The first pressure in the primary passageway is greater than the second pressure in the secondary passageway, and the environment pressure is greater than the second pressure in the secondary passageway.

In one embodiment, the valve assembly has at least one safety mode whereby the valve closes the primary passageway in response to an increase of the second pressure in the secondary passageway.

In one embodiment, an increase of the second pressure in the secondary passageway is a consequence of at least one of a leak between the first fluid line and the second fluid line and a leak between the second fluid line and the environment.

In one embodiment, the valve includes a spring loaded ball selectively abutting a seat of the primary passageway. In the open position, the ball is spaced away from the seat. In the closed position, the ball abuts the seat. The spring biases the ball toward the closed position In one embodiment, a piston selectively abuts the ball. The piston is disposed vertically below the ball opposite from the spring. The piston is movable between an upper position and a lower position. In the upper position, the piston abuts the ball and displaces the ball upward away from the seat thereby moving the valve in the open position. In the lower position, the piston induces the ball to move downward toward the seat thereby moving the valve in the closed position.

In one embodiment, in the upper position, the piston abuts the ball, and in the lower position, the piston is spaced away from the ball and lets the ball move downward toward the seat under the influence of the spring.

In one embodiment, the piston includes a piston rod having a first end and a second end. The first end is disposed vertically below the ball. The second end is fixedly connected to a piston head.

In one embodiment, an upper surface of the piston head and a portion of the body define a chamber. The chamber is in fluid communication with the secondary passageway. A variation of volume of the chamber is correlated to a vertical position of the piston.

In one embodiment, when the chamber is at a maximum volume, the piston is in the lower position and the ball abuts the seat. When the chamber is at a minimum volume, the piston is in the upper position and the ball is spaced from the seat.

In one embodiment, the piston head includes an upper piston and a lower position. The upper piston is fixedly connected to the lower piston. The upper piston is disposed vertically between the piston rod and the lower piston. A diaphragm is disposed between the upper piston and the lower piston. The diaphragm is adapted to isolate the upper piston form the environment. The lower piston is adapted to be in communication with the environment.

In one embodiment, a manual cut-off valve is disposed on the primary passageway between the first end and the second end. The manual cut-off valve is movable between a first position where the primary passageway is open and a second position where the primary passageway is closed. The first and second positions of the valve is independent of the first and second positions of the manual cut-off valve.

In one embodiment, the manual cut-off valve is removable from the body. When removed from the body, the primary passageway is adapted to be in communication with the environment.

In one embodiment, the manual cut-off valve includes a plug inserted in a cavity of the body. The plug having a bore. The bore defines a portion of the primary passageway. The plug is rotatable so as to move the bore on and away of the primary passageway. In a first position, the bore is aligned with the primary passageway and fluid communicates between the first and second ends of the primary passageway. In a second position, the bore is misaligned with the primary passageway and fluid is prevented from communicating between the first and second ends of the primary passageway.

In one embodiment, a fusible plug is disposed on the secondary passageway and adapted to be disposed at an interface with the environment. When a temperature is below a predetermined temperature the fusible plug is adapted to isolate the second fluid line from the environment. When the temperature is above predetermined temperature the fusible plug is adapted to at least partially communicate the second fluid line with the environment.

A valve assembly adapted to be used in an environment having an environment pressure is provided. The valve assembly comprises a body having a first end and a second end. The second end is adapted to connect to a pipe. The pipe has a first fluid line at a first pressure and a second fluid line at a second pressure. The first fluid line is disposed coaxially with the second fluid line. A primary passageway is defined through the body. The passageway has a first end coinciding with the first end of the body and a second end coinciding with the second end of the body. The second end of the primary passageway is adapted to be connected to the first fluid line. A secondary passageway is defined in the body. The secondary passageway has a first end and a second end. The secondary passageway is fluidly isolated from the primary passageway. The second end of the secondary passageway is adapted to be connected to the second fluid line. A valve is disposed on the primary passageway between the first end and the second end. The valve is movable between a first position where the primary passageway is open and fluid communicates between the first end and the second end of the primary passageway, and a second position where the primary passageway is closed and fluid is prevented from communicating between the first end and the second end of the primary passageway. The valve is adapted to be movable to the first and second positions in response to the second pressure in the secondary passageway. A manual cut-off valve is disposed on the primary passageway between the first end and the second end. The manual cut-off valve is movable between a first position where the primary passageway is open and a second position where the primary passageway is closed. The first and second positions of the valve are independent of the first and second positions of the manual cut-off valve. A fusible plug is disposed on the secondary passageway. When a temperature is below a predetermined temperature the fusible plug isolates the second fluid line from the environment, and when the temperature is above predetermined temperature the fusible plug at least partially communicates the second fluid line with the environment.

Embodiments of the present can have at least one of the above-mentioned aspects, but do not necessarily have all of them.

Additional and/or alternative features, aspects, and advantages of embodiments of the present will become apparent from the following description, the accompanying drawings, and the appended claims.

BRIEF DESCRIPTION OF THE DRAWINGS

For a better understanding of the present, as well as other aspects, and further features thereof, reference is made to the following description which is to be used in conjunction with the accompanying drawings, where.

DETAILED DESCRIPTION

The description which follows, and the embodiments described therein are provided by way of illustration of an example, or examples of particular embodiments of principles and aspects of the present discovery. These examples are provided for the purpose of explanation and not of limitation, of those principles of the discovery. In the description that follows, like parts are marked throughout the specification and the drawings with the same respective reference numerals.

Figure 1:
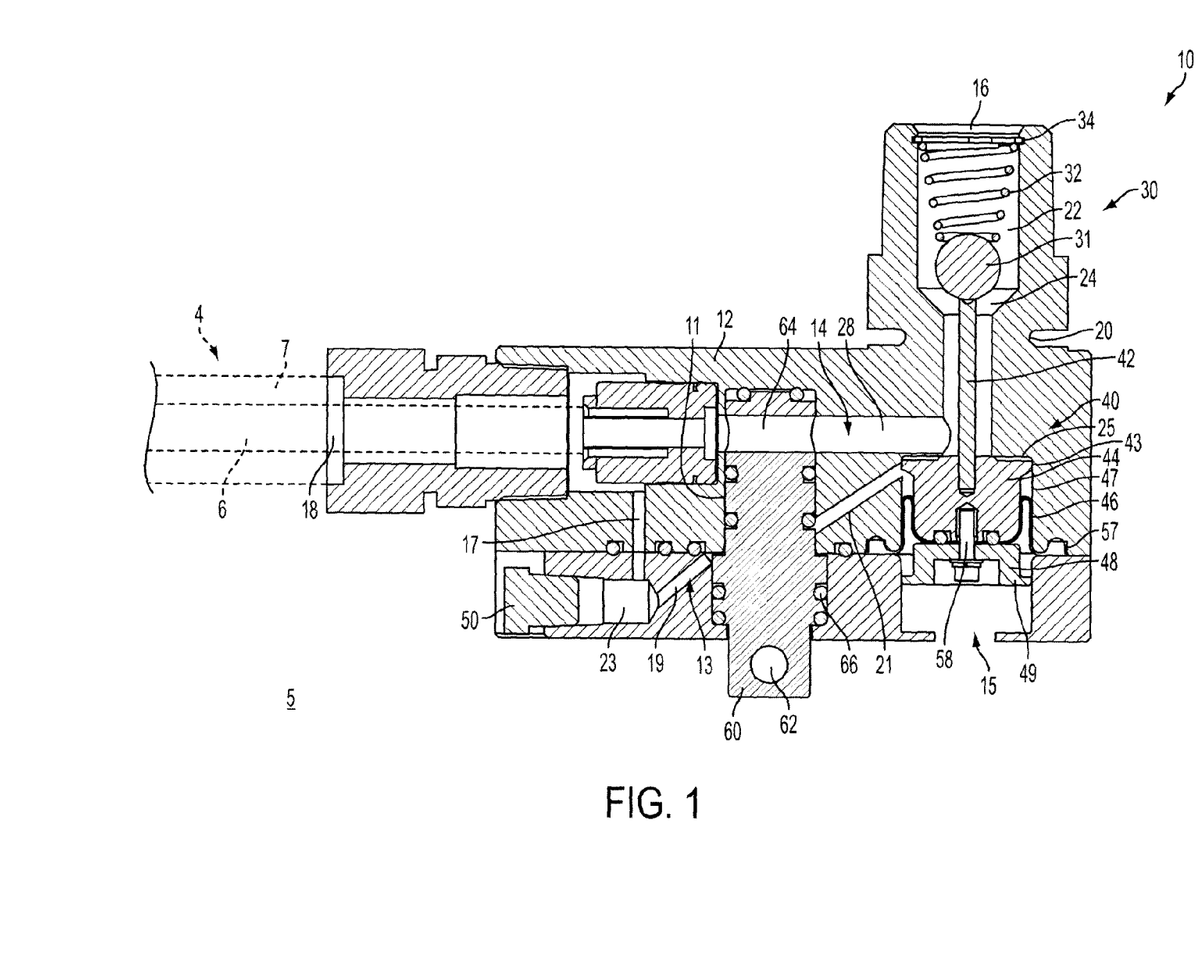
FIG. 1 is a cross-sectional view of a first embodiment of a valve assembly shown with a valve in an open position.
Figure 2:
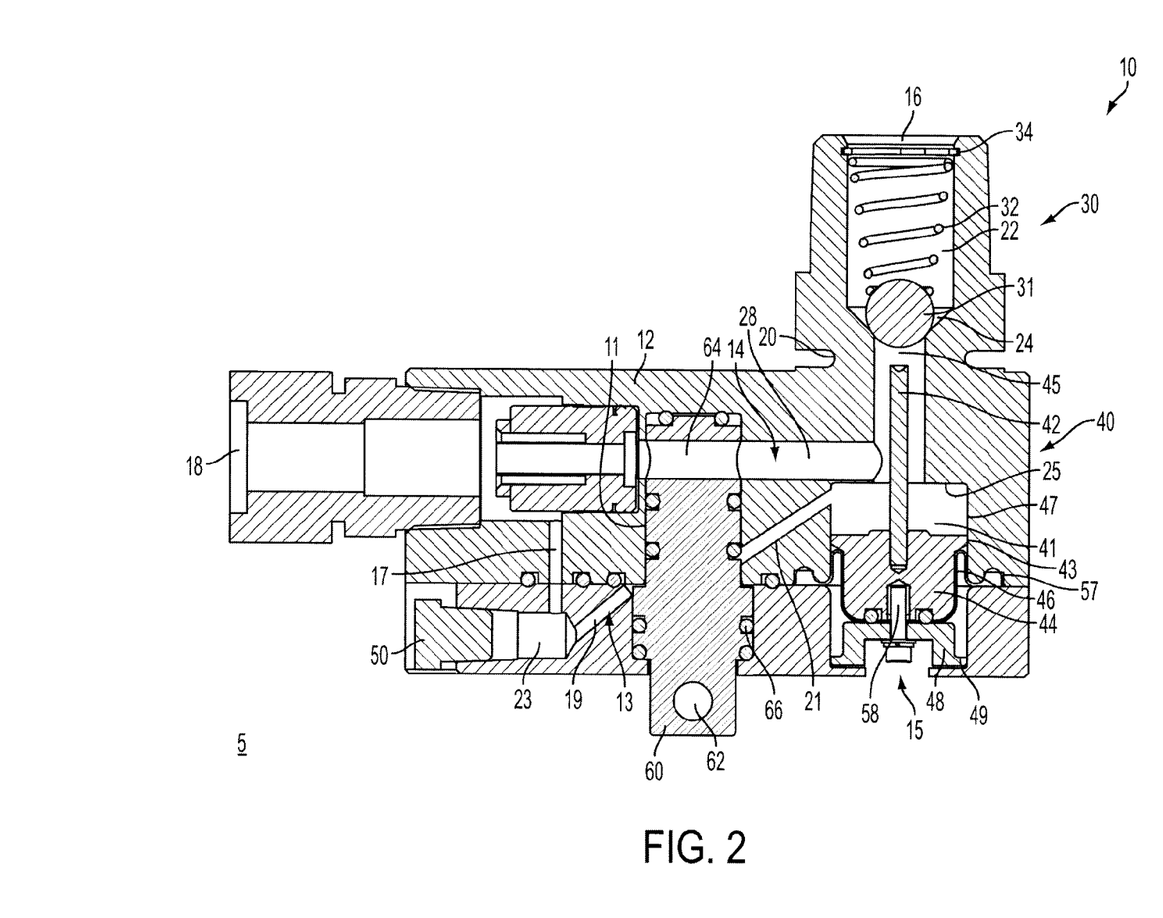
FIG. 2 is the cross-sectional view of FIG. 1 shown with the valve in a closed position.

Referring to FIGS. 1 and 2, a first embodiment of a valve assembly 10 will be described.

The valve assembly 10 comprises a body 12 having a primary passageway 14 (shown in dark grey in FIG. 2) defined therethrough between an inlet 16 and an outlet 18. The body 12 is made of aluminum. It is contemplated that the body 12 could be made of bronze, brass, steel, or any other material based on the type of fluid in process. The body 12 has a secondary passageway 13 (shown in light grey in FIG. 2) which is fluidly isolated from the primary passageway 14. The primary passageway 14 and the secondary passageway 13 will be described in detail below. The body 12 includes a neck 20 which is used as a breakoff assembly, as will be described below.

The valve assembly 10 is adapted to connect to a fluid source at the inlet 16. The source is a reservoir (not shown) of gas. It is contemplated that the source could be a tank or reservoir of a liquid, such as fuel. The valve assembly 10 is adapted to connect to a fluid recipient device (not shown) at the outlet 18. The fluid recipient device is connected to the valve assembly 10 via a pipe 4 (shown in phantom lines in FIG. 1). The pipe 4 includes an inner fluid line 6 and a coaxial outer fluid line 7 (also shown in phantom lines in FIG. 1). The outer fluid line 7 is disposed around the inner fluid line 6 and is filled with a gas at a pressure different from the one of the inner fluid line 6. In the embodiment shown in FIGS. 1 and 2, the inner fluid line 6 has a pressure higher than the outer fluid line 7 and the outer fluid line 7 is under vacuum. It is contemplated that the outer fluid line 7 could not be at vacuum, as long as the inner fluid line 6 has a pressure higher than the outer fluid line 7. In the embodiment described in FIGS. 1 and 2, the outer fluid line 7 has also a pressure lower than a pressure of a surrounding environment 5, which in the embodiment shown herein is at atmospheric pressure.

The inner fluid line 6 fluidly connects to the primary passageway 14, while the outer fluid line 7 fluidly connects to the secondary passageway 13. As such, in normal operation, the outer fluid line 7 and the inner fluid line 6 do not communicate with each other.

Progressing from the inlet 16 to the outlet 18, the primary passageway 14 includes an upper vertical passageway 22, an angled passageway 24, a narrowed vertical passageway 26, and an horizontal passageway 28. Although the upper passageway 22 is shown herein as having a cylindrical shape, other shapes are also contemplated. A bottom of the upper passageway 22 connects to the vertical angled passageway 24. The angled passageway 24 is cone shaped to provide a valve seat to a valve member 30. The valve member 30 will be described below. It is contemplated that the valve assembly 10 could include more than one valve member 30.

The narrowed vertical passageway 26 extends downwardly from the bottom of the angled passageway 24. The narrowed passageway 26 is cylindrical with a diameter equal to that of the outlet of the angled passageway 24. It is contemplated that the narrowed passageway 26 could have a shape other than the one shown and described herein. For example, the narrowed passageway 26 could be square. The narrowed passageway 26 connects to the horizontal passageway 28 at a bottom thereof. The horizontal passageway 28 is cylindrical and has a diameter equal to the one of the narrowed passageway 26. It is contemplated that the horizontal passageway 28 could have a diameter greater or smaller than the one of the passageway 26. The horizontal passageway 28 includes a portion defined in a manual cut-off valve 60. The manual cut-off valve 60 will be described below.

The secondary passageway 13 includes a vertical passageway 17 and oblique passageways 19 and 21. The vertical passageway 17 is in communication with the outer fluid line 7 on one end and with a chamber 23 on the other end. The chamber 23 is sealed by a fusible plug 50, which will described below. The chamber 23 connects to the first oblique passageway 19. The first oblique passageway 19 is connected to the second oblique passageway 21 by a connection not visible on FIGS. 1 and 2. The second oblique passageway 21 communicates with an upper chamber 41 which has a variable volume. As a result, a volume of the upper chamber 41 depends on a pressure of the outer fluid line 7.

The valve member 30 includes a ball 31 and a spring 32. The ball 31 which is disposed within the vertical passageways 22, 24, is movable between an open position (shown in FIG. 1) where the ball 31 is disposed away from the angled passageway 24 and where fluid is allow to flow around the ball 31 from the inlet 16 to the outlet 18, and a closed position (shown in FIG. 2) where the ball 31 is in abutment with the angled passageway 24 and where fluid is prevented to flow around the ball 31 through the passageway 24 toward the outlet 18. The spring 32 biases the ball 31 towards the closed position. The shape of the ball 31 and the angled passageway 24 need not be of circular cross section and may be varied as long as the valve member is movable to close the passageway it is disposed in. A spring washer 34 and a spring retaining ring (not shown) are disposed above the spring 32. The spring retaining ring snaps into a recessed ring (not shown) in the body 12 to connect the spring 32 to the body 12. The spring 32 is compressible between the spring washer 34 and the ball 31. Fluid can flow through the spring 32, the spring retaining ring and the spring washer 34. It is contemplated that a biasing member other than the spring 32 could be used for biasing the ball 31 towards the closed position. The diameter of the bottom of the angled passageway 24 is smaller than a diameter of the ball 31, and a diameter of the upper passageway 22 is greater than the diameter of the ball 31 so that fluid may flow through the upper passageway 22 around the ball 31.

The ball 31 is supported by a piston rod 42 which is connected a piston assembly 40. The piston assembly 40 includes from the piston rod 42 downwards, an upper piston 44, a diaphragm 46, and a lower piston 48. The piston assembly 40 is movable between an upper position (shown in FIG. 1) where the piston assembly 40 forces the valve assembly 30 in the open position and a lower position (shown in FIG. 2) where the piston assembly 40 forces the valve assembly 30 in the closed position depending of a pressure of the fluid contained in the upper chamber 41 (i.e. a pressure of the outer fluid line 7). The upper chamber 41 is shown in FIG. 2.

The upper chamber 41 is defined between an upper wall 25, a piston cylinder 47, and the upper piston 44. The oblique passageway 21 connects the upper chamber 41 to the outer fluid line 7. Therefore, when the valve member 30 is in the closed position (i.e. when pressure in the secondary passageway 13 is higher than pressure in the primary passageway 14), the upper chamber 41 is expanded, the piston assembly 40 moves downward, and the ball 31 abuts the angular passageway 24. When the valve member 30 is in the open position (i.e. when pressure in the secondary passageway 13 is lower than pressure in the primary passageway 14), a volume of the upper chamber 41 is reduced, the piston assembly 40 moves upwardly and the ball 31 is disposed away from the angular passageway 24.

The piston rod 42 abuts an underside of the ball 31 opposite to the biasing spring 32. The piston rod 42 is press fit into the upper piston 44, which is disposed vertically below the piston rod 42. The upper piston 44 is movable vertically within the piston cylinder 47, so that when the upper piston 44 is in the lower position of the piston assembly 40, a gap 45 (shown in FIG. 2) is formed between the piston rod 42 and the ball 31. It is contemplated that the valve assembly 10 could be designed so that the ball 31 could be fixedly connected to the piston rod 42, and that when the upper piston 44 is in the lower position of the piston assembly 40, no gap 45 could be formed between the piston rod 42 and the ball 31 but still the valve member 30 would accomplish its task. It is also contemplated that the piston rod 42 be fixedly connected to the ball 31 and that the spring 32 could be omitted. An outer circumference of the upper piston 44 has a shoulder 43 so that the upper piston 44 has a diameter sized to match a diameter of the piston cylinder 47. A bottom of the upper piston 44 receives a screw 58 for connecting the upper piston 47 to the lower piston 48.

The diaphragm 46 prevents fluid communication between the primary passageway 14 and the secondary passageway 13, should fluid escape on sides of the upper and lower pistons 44, 48 toward the upper chamber 41. The diaphragm 46 is circular, flexible and has a hole in the middle to receive the screw 58. The diaphragm 46 is sandwiched in part between the upper piston 44 and the lower piston 48. The diaphragm 46 also has a thick rim (not shown) around its circumference. The rim of the diaphragm 46 is inserted into a recess 57.

The lower piston 48 has an inverted cup shape with an outwardly extending shoulder 49 so that the lower piston 48 has a diameter sized to match a diameter of the piston cylinder 47. The lower piston 48 has a hole (not shown) through the middle to receive the screw 58. A flat washer and a lock washer (both not shown) are placed over the screw 58 which holds the pistons 44 and 48 and diaphragm 46 together. The connection is fluid tight so that no fluid can move through the centre hole in the diaphragm 46 for connecting securely the diaphragm 46 to the body 12. The body 12 includes an opening 15 disposed vertically below the lower piston 48 so that an outside of the lower piston 48 is in contact with the environment 5. It is contemplated that the opening 15 could instead connect to the inner fluid line 6 or any other fluid line where the pressure is higher than the pressure of the outer fluid line 7.

Although a particular piston assembly 40 and valve member 30 have been described, it should be understood that other piston assemblies, valve members and other shapes of components may be provided. For example, the lower piston 48 may be flattened. In another example, a shape of the upper piston 44 may be altered. In yet another example, a single piston rather than two pistons 44 and 48 may be used. In yet another example, the diaphragm 46 may be removed and the pistons 44, 48 sealed to the cylinder in a fluid tight manner.

The manual cut-off valve 60 will now be described. The manual cut-off valve 60 includes a rubber plug 62 having a horizontal bore 64 extending therethrough. The manual cut-off valve 60 is sealed to the body 12 by a plurality of O-rings 66 (only one being shown to avoid cluttering the drawings). The manual cut-off valve 60 is rotatable along a vertical axis 61 (shown in FIG. 1) so as to position the bore 64 between a first position where the bore 64 is aligned with the primary passageway 14 (shown in FIGS. 1 and 2) and a second position where the bore 64 is at an angle relative to the primary passageway 14 and fluid communication is interrupted between the inlet 16 and the outlet 18. The manual cut-off valve 60 is operable via an opening 68 disposed at an end of the manual cut-off valve 60 opposite to the bore 64, such that a tool can be inserted into the opening 68 to facilitate rotation of the manual cut-off valve 60 around the vertical axis 61. Such tool could, for example, be a screw driver. The opening 68 could be omitted or replaced by another facilitating rotation of the plug 60. The manual cut-off valve 60 is disposed within a cavity 11 of the body 12 which is in fluid communication with the passageways 13, 14. When the manual cut-off valve 60 is within the cavity 11, whether it is in the first or second position, the passageways 13, 14 are isolated from the environment 5. However, when the manual cut-off valve 60 is removed from the cavity 11, the passageways 13, 14 becomes in contact with the environment 5 which affects a pressure within the outer fluid line 7. Thus, the manual cut-off valve 60 may be used as an emergency trigger whereby pulling the manual cut-off valve 60 out of the body 12 triggers one of the safety modes described below by inducing a change of pressure in the outer fluid line 7. It is contemplated that the manual cut-off valve 60 could be omitted.

The fusible plug 50 is disposed at en end of the chamber 23 which, as described above, is in fluid communication with the outer fluid line 7. The fusible plug 50 is adapted to melt at a predetermined temperature of 165° C. (329° F.). Such temperatures could be reached in the case, for example, of a fire. As a consequence, the fusible plug 50 may serve as safety for the valve assembly 10. It is contemplated that the fusible plug 50 could melt at temperatures other than 165° C. It is also contemplated that the fusible plug 50 could be omitted.

Under normal operation (as shown in FIG. 1), the outer flow line 7 is not in fluid communication with the inner flow line 6, and the valve assembly 10 remains in the open position until it moves to the closed position in response to one or more of the following modes of failure. These safety modes allow to close the primary passageway 14 when either or the inner fluid line 6 and the outer fluid line 7 is leaking or ruptured.

In a first safety mode, if the inner fluid line 6 leaks into the outer fluid line 7, pressure in the secondary passageway 13 increases (since under normal conditions the outer fluid line 7 has a pressure lower than the inner fluid line 6), which will increase the volume of the upper chamber 41, thereby moving the ball 31 toward the passageway 24 and interrupting fluid communication in the primary passageway 14.

In a second safety mode, if the outer fluid line 7 leaks and becomes in contact with the environment 5. Since the environment 5 has a pressure higher than the outer fluid line 7, pressure in the secondary passageway 13 increases, which will increase the volume of the upper chamber 41, thereby moving the ball 31 toward the passageway 24 and interrupting fluid communication in the primary passageway 14.

In a third safety mode, if the valve assembly 10 is broken at the neck 20 (e.g. when struck with a shearing force), a pressure of a portion of the primary passageway 14 ahead of the ball 31 will be greater than a pressure of a portion of the primary passageway 14 after of the ball 31. As a result, the biasing spring 32 will move the ball 31 downwards toward the passageway 24, thereby closing the primary passageway 14. In some cases, a complete shearing of the neck 20 may cause the body 12 to break into two portions. In such event, the valve assembly 10 will close by having the ball 31 abut the passageway 24.

In a fourth safety mode, an emergency closing of the valve assembly 10 can be achieved by pulling the manual cut-off valve 60 out of the body 12. By doing so, the inner fluid line 6 becomes in contact with the environment 5 and the outer fluid line 7, pressure in the secondary passageway 13 increases, which will increase the volume of the upper chamber 41, thereby moving the ball 31 toward the passageway 24.

In a fifth safety mode, an emergency closing of the valve assembly 10 can be achieved by rotating the manual cut-off valve 60 so that the bore 64 is angled with respect to the primary passageway 14, thereby closing the primary passageway 14.

In a sixth safety mode, the fusible plug 50 melts at least partially if temperature exceeds the predetermined temperature, thereby allowing communication between the secondary passageway 13 with the environment 5. As a result, pressure in the secondary passageway 13 increases, which increases the volume of the upper chamber 41, thereby moving the ball 30 toward the passageway 24.

It is contemplated that the valve assembly 10 could have more or less safety modes than the ones recited above.

To install the valve assembly 10, the valve assembly 10 is first positioned in the closed position shown in FIG. 2 with the ball 31 seated in the angled passageway 24 by the expansion force of the compressed spring 32 to prevent fluid flow through the primary passageway 14 and by having the piston rod 42 in a lower position away from the ball 31. The valve assembly 10 is then connected to the reservoir at the inlet 16 and to the inner fluid line 6 of the pipe at the outlet 18. When the above connections are made, the passageway 14 is fluid tight from the reservoir to the pipe 4. The secondary passageway 13 is then connected to the outer flow line 7. Vacuum is then made in the outer fluid line 7. Decrease in pressure in the outer fluid line 7 reduces a volume of the upper chamber 41, thereby pushing the pistons 44 and 48 upward which in turn move the piston rod 42 upward. The piston rod 42 pushes the ball 31 upward, compressing the spring 32 and lifting the ball 31 out of contact with the angled passageway 24 to open the passageway 14. The pistons 44 and 48 move upward by the increasing pressure until the upper piston 44 contact an abutting wall 25 defined in the body 12.

Figure 3:
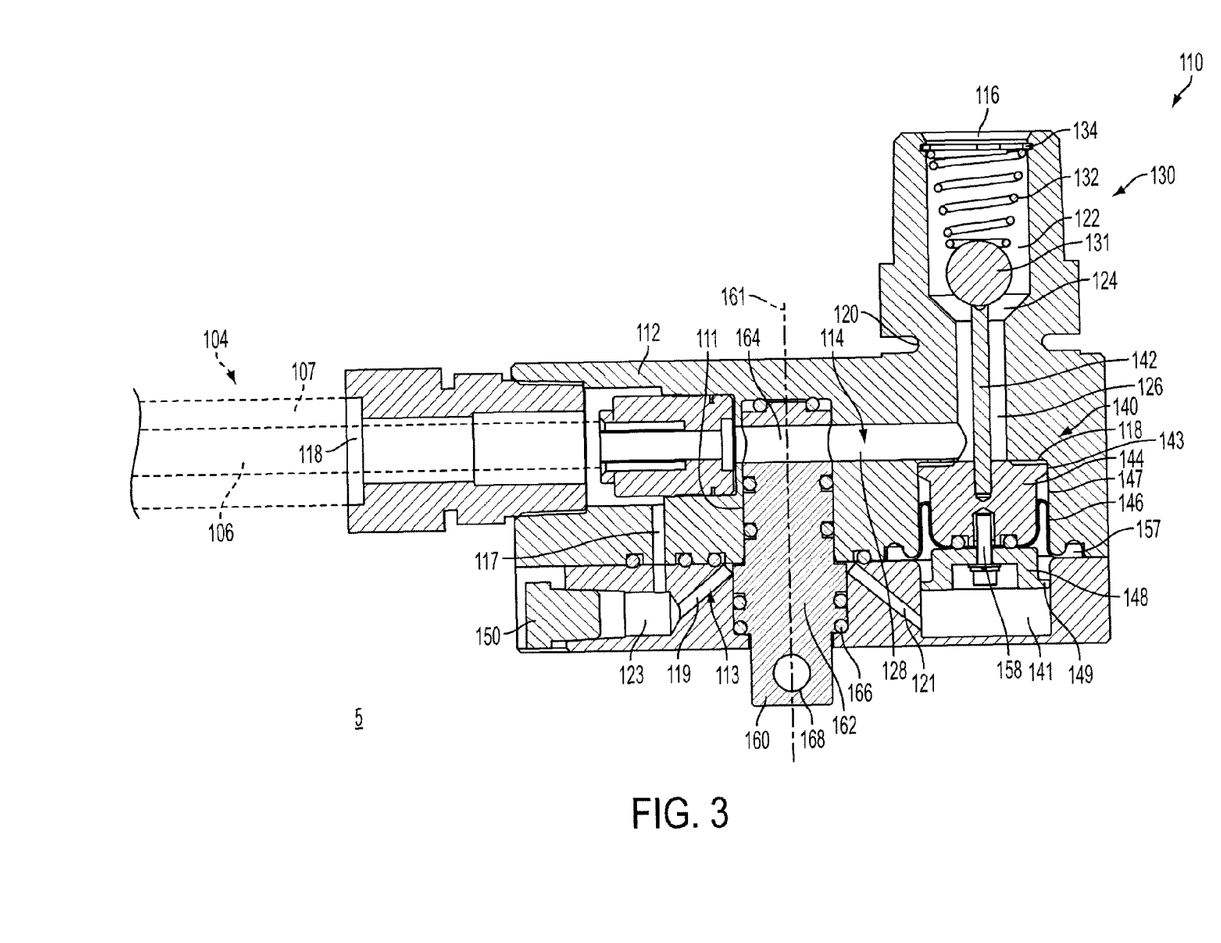
FIG. 3 is a cross-sectional view of a second embodiment of a valve assembly shown with a valve in an open position.
Figure 4:
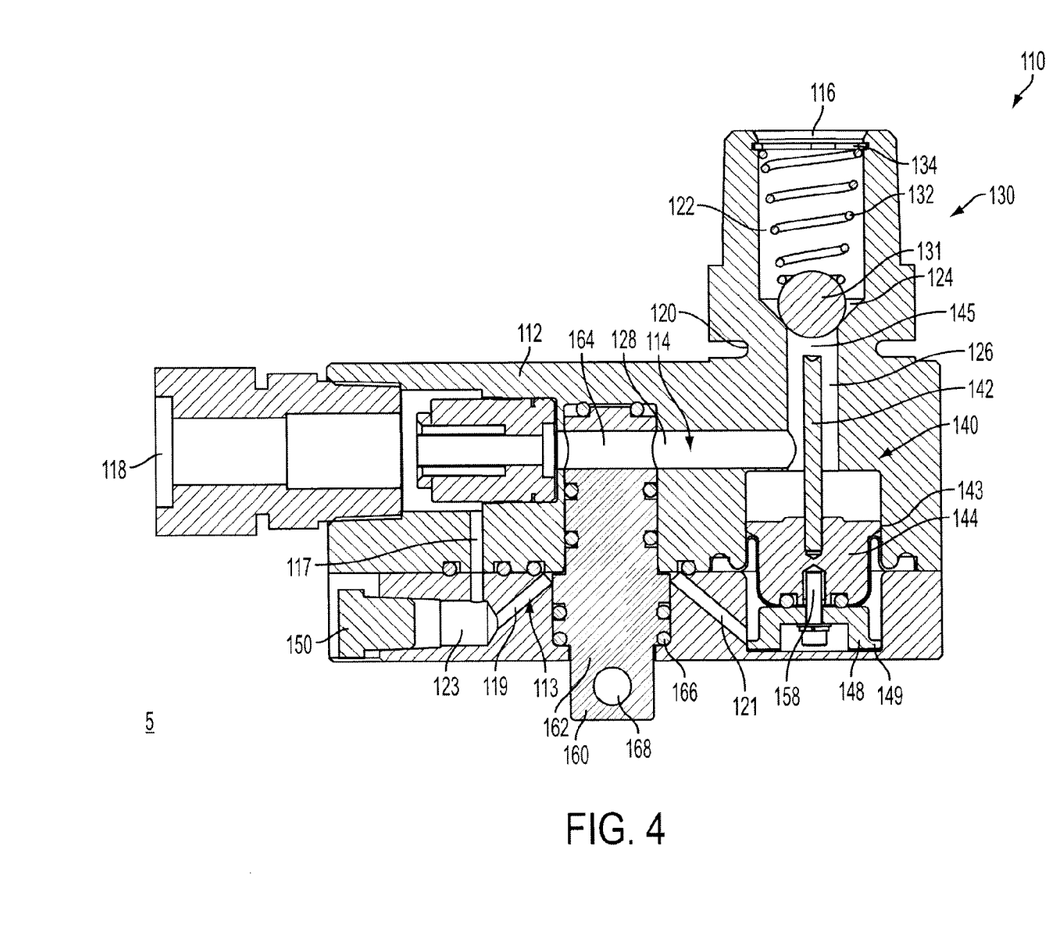
FIG. 4 is the cross-sectional view of FIG. 3 shown with the valve in a closed position.

Turning now to FIGS. 3 and 4, a valve assembly 110 according to a second embodiment will be described.

The valve assembly 110 has components similar to the ones of the valve assembly 100. Such components will have same references numerals as the ones of the valve assembly 10 but in the hundred range. The second embodiment of the valve assembly 110 differs from the first embodiment of the valve assembly 10 in that the valve assembly 110 allows to receive a fluid in the inner fluid line at a pressure lower than the fluid of the outer fluid line. As such, a chamber disposed below the piston assembly (as opposed to the upper chamber 41) is in communication with the secondary passageway.

The valve assembly 110 comprises a body 112 having a primary passageway 114 defined therethrough between an inlet 116 and an outlet 118. The body 112 is made of aluminum. It is contemplated that the body 112 could be made of bronze, brass, steel, or any other material based on the type of fluid in process. The body 112 has a secondary passageway 113 which is fluidly isolated from the primary passageway 114. The primary passageway 114 and the secondary passageway 113 will be described in detail below. The body 112 includes a neck 120 which is used as a breakoff assembly, as will be described below.

The valve assembly 110 is adapted to connect to a fluid source at the inlet 116. The source is a reservoir (not shown) of gas. It is contemplated that the source could be a tank or reservoir of a liquid, such as fuel. The valve assembly 110 is adapted to connect to a fluid recipient device (not shown) at the outlet 118. The fluid recipient device is connected to the valve assembly 110 via a pipe 104 (shown in phantom lines in FIG. 3). The pipe 104 includes an inner fluid line 106 and a coaxial outer fluid line 107 (also shown in phantom lines in FIG. 3). The outer fluid line 107 is disposed around the inner fluid line 106 and is filled with a gas at a pressure different from the one of the inner fluid line 106. In the embodiment shown in FIGS. 3 and 4, the inner fluid line 106 has a pressure lower than the outer fluid line 107. In the embodiment described in FIGS. 3 and 4, the outer fluid line 107 has also a pressure higher than a pressure of a surrounding environment 105, which in the embodiment shown herein is at atmospheric pressure.

The inner fluid line 106 fluidly connects to the primary passageway 114, while the outer fluid line 107 fluidly connects to the secondary passageway 113. As such, in normal operation, the outer fluid line 107 and the inner fluid line 106 do not communicate with each other.

Progressing from the inlet 116 to the outlet 118, the primary passageway 114 includes an upper vertical passageway 122, an angled passageway 124, a narrowed vertical passageway 126, and an horizontal passageway 128. Although the upper passageway 122 is shown herein as having a cylindrical shape, other shapes are also contemplated. A bottom of the upper passageway 122 connects to the vertical angled passageway 124. The angled passageway 124 is cone shaped to provide a valve seat to a valve member 130. The valve member 130 will be described below. It is contemplated that the valve assembly 110 could include more than one valve member 130.

The narrowed vertical passageway 126 extends downwardly from the bottom of the angled passageway 124. The narrowed passageway 126 is cylindrical with a diameter equal to that of the outlet of the angled passageway 124. It is contemplated that the narrowed passageway 126 could have a shape other than the one shown and described herein. For example, the narrowed passageway 126 could be square. The narrowed passageway 126 connects to the horizontal passageway 128 at a bottom thereof. The horizontal passageway 128 is cylindrical and has a diameter equal to the one of the narrowed passageway 126. It is contemplated that the horizontal passageway 128 could have a diameter greater or smaller than the one of the passageway 126. The horizontal passageway 128 includes a portion defined in a manual cut-off valve 160. The manual cut-off valve 160 will be described below.

The secondary passageway 113 includes a vertical passageway 117 and oblique passageways 119 and 121. The vertical passageway 117 is in communication with the outer fluid line 107 on one end and with a chamber 123 on the other end. The chamber 123 is sealed by a fusible plug 150, which will described below. The chamber 123 connects to the first oblique passageway 119. The first oblique passageway 119 is connected to the second oblique passageway 121 by a connection not visible on FIGS. 3 and 4. The second oblique passageway 121 communicates with a lower chamber 141 which has a variable volume. As a result, a volume of the lower chamber 141 depends on a pressure of the outer fluid line 107.

The valve member 130 includes a ball 131 and a spring 132. The ball 131 which is disposed within the vertical passageways 122, 124, is movable between an open position (shown in FIG. 3) where the ball 131 is disposed away from the angled passageway 124 and where fluid is allow to flow around the ball 131 from the inlet 116 to the outlet 118, and a closed position (shown in FIG. 4) where the ball 131 is in abutment with the angled passageway 124 and where fluid is prevented to flow around the ball 131 through the passageway 124 toward the outlet 118. The spring 132 biases the ball 131 towards the closed position. The shape of the ball 131 and the angled passageway 124 need not be of circular cross section and may be varied as long as the valve member is movable to close the passageway it is disposed in. A spring washer 134 and a spring retaining ring (not shown) are disposed above the spring 132. The spring retaining ring snaps into a recessed ring (not shown) in the body 112 to connect the spring 132 to the body 112. The spring 132 is compressible between the spring washer 134 and the ball 131. Fluid can flow through the spring 132, the spring retaining ring and the spring washer 134. It is contemplated that a biasing member other than the spring 132 could be used for biasing the ball 131 towards the closed position. The diameter of the bottom of the angled passageway 124 is smaller than a diameter of the ball 131, and a diameter of the upper passageway 122 is greater than the diameter of the ball 131 so that fluid may flow through the upper passageway 122 around the ball 131.

The ball 131 is supported by a piston rod 142 which is connected a piston assembly 140. The piston assembly 140 includes from the piston rod 142 downwards, an upper piston 144, a diaphragm 146, and a lower piston 148. The piston assembly 140 is movable between an upper position (shown in FIG. 3) where the piston assembly 140 forces the valve assembly 130 in the open position and a lower position (shown in FIG. 4) where the piston assembly 140 forces the valve assembly 130 in the closed position depending of a pressure of the fluid contained in the lower chamber 141 (i.e. a pressure of the outer fluid line 107). The upper chamber 141 is shown in FIG. 3.

The lower chamber 141 is defined between a lower wall 125, a piston cylinder 147, and the lower piston 148. The oblique passageway 121 connects the lower chamber 141 to the outer fluid line 107. Therefore, when the valve member 130 is in the closed position (i.e. when pressure in the secondary passageway 113 is lower than pressure in the primary passageway 114), the lower chamber 141 is retracted, the piston assembly 140 moves downward, and the ball 131 abuts the angular passageway 124. When the valve member 130 is in the open position (i.e. when pressure in the secondary passageway 113 is higher than pressure in the primary passageway 114), a volume of the lower chamber 141 increases, the piston assembly 140 moves upwardly and the ball 131 is disposed away from the angular passageway 124.

The piston rod 142 abuts an underside of the ball 131 opposite to the biasing spring 132. The piston rod 142 is press fit into the upper piston 144, which is disposed vertically below the piston rod 142. The upper piston 144 is movable vertically within the piston cylinder 147, so that when the upper piston 144 is in the lower position of the piston assembly 140, a gap 145 (shown in FIG. 4) is formed between the piston rod 142 and the ball 131. It is contemplated that the valve assembly 110 could be designed so that the ball 131 could be fixedly connected to the piston rod 142, and that when the upper piston 144 is in the lower position of the piston assembly 140, no gap 145 could be formed between the piston rod 142 and the ball 131 but still the valve member 130 would accomplish its task. It is also contemplated that the piston rod 142 be fixedly connected to the ball 131 and that the spring 132 could be omitted. An outer circumference of the upper piston 144 has a shoulder 143 so that the upper piston 144 has a diameter sized to match a diameter of the piston cylinder 47. A bottom of the upper piston 144 receives a screw 158 for connecting the upper piston 147 to the lower piston 148.

The diaphragm 146 prevents fluid communication between the primary passageway 114 and the secondary passageway 113, should fluid escape on sides of the upper and lower pistons 144, 148 toward the lower chamber 141. The diaphragm 146 is circular, flexible and has a hole in the middle to receive the screw 158. The diaphragm 146 is sandwiched in part between the upper piston 144 and the lower piston 148. The diaphragm 146 also has a thick rim (not shown) around its circumference. The rim of the diaphragm 146 is inserted into a recess 157.

The lower piston 148 has an inverted cup shape with an outwardly extending shoulder 149 so that the lower piston 148 has a diameter sized to match a diameter of the piston cylinder 147. The lower piston 148 has a hole (not shown) through the middle to receive the screw 158. A flat washer and a lock washer (both not shown) are placed over the screw 158 which holds the pistons 144 and 148 and diaphragm 146 together. The connection is fluid tight so that no fluid can move through the centre hole in the diaphragm 146 for connecting securely the diaphragm 146 to the body 112.

Although a particular piston assembly 140 and valve member 130 have been described, it should be understood that other piston assemblies, valve members and other shapes of components may be provided. For example, the lower piston 148 may be flattened. In another example, a shape of the upper piston 144 may be altered. In yet another example, a single piston rather than two pistons 144 and 148 may be used. In yet another example, the diaphragm 146 may be removed and the pistons 144, 148 sealed to the cylinder in a fluid tight manner.

The manual cut-off valve 160 will now be described. The manual cut-off valve 160 includes a rubber plug 162 having a horizontal bore 164 extending therethrough. The manual cut-off valve 160 is sealed to the body 112 by a plurality of O-rings 166 (only one being shown to avoid cluttering the drawings). The manual cut-off valve 160 is rotatable along a vertical axis 161 (shown in FIG. 3) so as to position the bore 164 between a first position where the bore 164 is aligned with the primary passageway 114 (shown in FIGS. 3 and 4) and a second position where the bore 164 is at an angle relative to the primary passageway 114 and fluid communication is interrupted between the inlet 116 and the outlet 118. The manual cut-off valve 160 is operable via an opening 168 disposed at an end of the manual cut-off valve 160 opposite to the bore 164, such that a tool can be inserted into the opening 168 to facilitate rotation of the manual cut-off valve 160 around the vertical axis 161. Such tool could, for example, be a screw driver. The opening 168 could be omitted or replaced by another facilitating rotation of the plug 160. The manual cut-off valve 160 is disposed within a cavity 111 of the body 112 which is in fluid communication with the passageways 113, 114. When the manual cut-off valve 160 is within the cavity 111, whether it is in the first or second position, the passageways 113, 114 are isolated from the environment 105. However, when the manual cut-off valve 160 is removed from the cavity 111, the passageways 113, 114 becomes in contact with the environment 105 which affects a pressure within the outer fluid line 107. Thus, the manual cut-off valve 160 may be used as an emergency trigger whereby pulling the manual cut-off valve 160 out of the body 112 triggers one of the safety modes described below by inducing a change of pressure in the outer fluid line 107. It is contemplated that the manual cut-off valve 160 could be omitted.

The fusible plug 150 is disposed at en end of the chamber 123 which, as described above, is in fluid communication with the outer fluid line 107. The fusible plug 150 is adapted to melt at a predetermined temperature of 165° C. (329° F.). Such temperatures could be reached in the case, for example, of a fire. As a consequence, the fusible plug 150 may serve as safety for the valve assembly 110. It is contemplated that the fusible plug 150 could melt at temperatures other than 165° C. It is also contemplated that the fusible plug 150 could be omitted.

Under normal operation, the outer flow line 107 is not in fluid communication with the inner flow line 106, and the valve assembly 110 remains in the open position until it moves to the closed position in response to one or more of the following modes of failure.

In a first safety mode, if the inner fluid line 106 leaks into the outer fluid line 107, pressure in the secondary passageway 113 decreases (since the outer fluid line 107 has a pressure higher than the inner fluid line 106), which will reduce the volume of the lower chamber 141, thereby moving the ball 131 toward the passageway 124.

In a second safety mode, if the outer fluid line 107 leaks and becomes in contact with the environment 5, pressure in the secondary passageway 113 decreases (since the outer fluid line 107 has a pressure higher than the environment 5), which will reduce the volume of the lower chamber 141, thereby moving the ball 131 toward the passageway 124.

In a third safety mode, if the valve assembly 110 is broken at the neck 120 (e.g. when struck with a shearing force), a pressure of a portion of the primary passageway 114 ahead of the ball 131 becomes greater than a pressure of a portion of the primary passageway 114 after of the ball 131. As a result, the biasing spring 132 moves the ball 131 downwards toward the passageway 124, thereby closing the primary passageway 114. In some cases, a complete shearing of the neck 120 may cause the body 112 to break into two portions. In such event, the valve assembly 110 will close by having the ball 131 abut the passageway 124.

In a fourth safety mode, an emergency closing of the valve assembly 110 can be achieved by pulling the manual cut-off valve 160 out of the body 112. By doing so, the inner fluid line 106 becomes in contact with the environment 5 and the outer fluid line 107, pressure in the secondary passageway 113 decreases, which reduces the volume of the lower chamber 141, thereby moving the ball 131 toward the passageway 124.

In a fifth safety mode, an emergency closing of the valve assembly 110 can be achieved by rotating the manual cut-off valve 160 so that the bore 164 is angled with respect to the primary passageway 114, thereby closing the primary passageway 114.

In a sixth safety mode, the fusible plug 150 melts at least partially if temperature exceeds the predetermined temperature, thereby allowing communication between the secondary passageway 113 with the environment 5. As a result, pressure in the secondary passageway 113 decreases, which reduces the volume of the lower chamber 41, thereby moving the ball 131 toward the passageway 124.

It is contemplated that the valve assembly 110 could have more or less safety modes than the ones recited above.

To install the valve assembly 110, the valve assembly 110 is first positioned in the closed position shown in FIG. 1 with the ball 131 seated in the angled passageway 124 by the expansion force of the compressed spring 132 to prevent fluid flow through the primary passageway 114. The valve assembly 110 is then connected to the reservoir at the inlet 116 and to the inner fluid line 106 of the pipe at the outlet 118. When the above connections are made, the passageway 114 is fluid tight from the reservoir to the pipe 104. The secondary passageway 113 is then connected to the outer flow line 107. The outer fluid line 107 having a pressure higher than the inner fluid line 6, as the fluid populates the outer flow line 107 (also known as "surveillance fluid"), the increase in pressure in the lower chamber 141 pushes the pistons 144 and 148 upward which in turn move the piston rod 142 upward. The piston rod 142 pushes the ball 131 upward, compressing the spring 132 and lifting the ball 131 out of contact with the angled passageway 124 to open the passageway 114. The pistons 144 and 148 move upward by the increasing pressure until the shoulder 43 of the upper piston 144 contacts an abutting wall 125 defined in the body 112.

Although the above description relates to a specific preferred embodiment as presently contemplated by the inventor, it will be understood that the discovery in its broad aspect includes mechanical and functional equivalents of the elements described herein.

We claim:

1. A valve assembly adapted to be used in an environment having an environment pressure, the valve assembly comprising:
   a body having a first end and a second end, the second end being adapted to connect to a pipe, the pipe having a first fluid line at a first pressure and a second fluid line at a second pressure, the first fluid line being disposed coaxially with the second fluid line;
   a primary passageway defined through the body, the passageway having a first end coinciding with the first end of the body and a second end coinciding with the second end of the body, the second end of the primary passageway being adapted to be connected to the first fluid line;
   a secondary passageway defined in the body, the secondary passageway having a first end and a second end, the secondary passageway being fluidly isolated from the primary passageway, the second end of the secondary passageway being adapted to be connected to the second fluid line; and
   a valve disposed on the primary passageway between the first end and the second end, the valve being movable between a first position where the primary passageway is open and fluid communicates between the first end and the second end of the primary passageway and a second position where the primary passageway is closed and fluid is prevented from communicating between the first end and the second end of the primary passageway, the valve being adapted to be movable to the first and second positions in response to the second pressure in the secondary passageway;
   wherein the first pressure in the primary passageway is greater than the second pressure in the secondary passageway, and the environment pressure is greater than the second pressure in the secondary passageway.

2. The valve assembly of claim 1, wherein the valve assembly has at least one safety mode whereby the valve closes the primary passageway in response to an increase of the second pressure in the secondary passageway.

3. The valve assembly of claim 2, wherein an increase of the second pressure in the secondary passageway is a consequence of at least one of a leak between the first fluid line and the second fluid line and a leak between the second fluid line and the environment.

4. The valve assembly of claim 1, wherein the valve includes a spring loaded ball selectively abutting a seat of the primary passageway;
   in the open position, the ball is spaced away from the seat;
   in the closed position, the ball abuts the seat; and
   the spring biases the ball toward the closed position.

5. The valve assembly of claim 4, further comprising a piston selectively abutting the ball;
   the piston is disposed vertically below the ball opposite from the spring;
   the piston is movable between an upper position and a lower position,
   wherein in the upper position, the piston abutting the ball and displacing the ball upward away from the seat thereby moving the valve in the open position;
   in the lower position, the piston induces the ball to move downward toward the seat thereby moving the valve in the closed position.

6. The valve assembly of claim 5, wherein
   in the upper position, the piston abuts the ball, and
   in the lower position, the piston is spaced away from the ball and lets the ball move downward toward the seat under the influence of the spring.

7. The valve assembly claim 5, wherein the piston includes a piston rod having a first end and a second end, the first end being disposed vertically below the ball, and the second end being fixedly connected to a piston head.

8. The valve assembly of claim 7, wherein an upper surface of the piston head and a portion of the body define a chamber;
   the chamber is in fluid communication with the secondary passageway; and
   a variation of volume of the chamber is correlated to a vertical position of the piston.

9. The valve assembly of claim 8, wherein when the chamber is at a maximum volume, the piston is in the lower position and the ball abuts the seat; and
   when the chamber is at a minimum volume, the piston is in the upper position and the ball is spaced from the seat.

10. The valve assembly of claim 7, wherein the piston head includes an upper piston and a lower position, the upper piston being fixedly connected to the lower piston, the upper piston being disposed vertically between the piston rod and the lower piston; and
    a diaphragm disposed between the upper piston and the lower piston, the diaphragm being adapted to isolate the upper piston form the environment, the lower piston being adapted to be in communication with the environment.

11. The valve assembly of claim 1, further comprising a manual cut-off valve disposed on the primary passageway between the first end and the second end, the manual cut-off valve being movable between a first position where the primary passageway is open and a second position where the primary passageway is closed, the first and second positions of the valve being independent of the first and second positions of the manual cut-off valve.

12. The valve assembly of claim 11, wherein the manual cut-off valve is removable from the body; and
when removed from the body, the primary passageway is adapted to be in communication with the environment.

13. The valve assembly of claim 11, wherein the manual cut-off valve includes a plug inserted in a cavity of the body, the plug having a bore, the bore defining a portion of the primary passageway, the plug being rotatable so as to move the bore on and away of the primary passageway,
in a first position, the bore is aligned with the primary passageway and fluid communicates between the first and second ends of the primary passageway, and
in a second position, the bore is misaligned with the primary passageway and fluid is prevented from communicating between the first and second ends of the primary passageway.

14. The valve assembly of claim 1, further comprising a fusible plug disposed on the secondary passageway and adapted to be disposed at an interface with the environment, when a temperature is below a predetermined temperature the fusible plug being adapted to isolate the second fluid line from the environment, and when the temperature is above predetermined temperature the fusible plug being adapted to at least partially communicate the second fluid line with the environment.

15. A valve assembly adapted to be used in an environment having an environment pressure, the valve assembly comprising:
a body having a first end and a second end, the second end being adapted to connect to a pipe, the pipe having a first fluid line at a first pressure and a second fluid line at a second pressure, the first fluid line being disposed coaxially with the second fluid line;
a primary passageway defined through the body, the passageway having a first end coinciding with the first end of the body and a second end coinciding with the second end of the body, the second end of the primary passageway being adapted to be connected to the first fluid line;
a secondary passageway defined in the body, the secondary passageway having a first end and a second end, the secondary passageway being fluidly isolated from the primary passageway, the second end of the secondary passageway being adapted to be connected to the second fluid line;
a valve disposed on the primary passageway between the first end and the second end, the valve being movable between a first position where the primary passageway is open and fluid communicates between the first end and the second end of the primary passageway and a second position where the primary passageway is closed and fluid is prevented from communicating between the first end and the second end of the primary passageway, the valve being adapted to be movable to the first and second positions in response to the second pressure in the secondary passageway;
a manual cut-off valve disposed on the primary passageway between the first end and the second end, the manual cut-off valve being movable between a first position where the primary passageway is open and a second position where the primary passageway is closed, the first and second positions of the valve being independent of the first and second positions of the manual cut-off valve; and
a fusible plug disposed on the secondary passageway, when a temperature is below a predetermined temperature the fusible plug isolating the second fluid line from the environment, and when the temperature is above predetermined temperature the fusible plug at least partially communicating the second fluid line with the environment.

* * * * *